(12) United States Patent
Gunnarson

(10) Patent No.: US 11,865,974 B2
(45) Date of Patent: Jan. 9, 2024

(54) MONITORING SYSTEM FOR A VEHICLE

(71) Applicant: Volvo Car Corporation, Gothenburg (SE)

(72) Inventor: Daniel Gunnarson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/842,856

(22) Filed: Jun. 17, 2022

(65) Prior Publication Data

US 2022/0402434 A1    Dec. 22, 2022

(30) Foreign Application Priority Data

Jun. 18, 2021    (EP) ..................................... 21180263

(51) Int. Cl.
*B60R 1/26*    (2022.01)
*G06V 20/58*    (2022.01)
(Continued)

(52) U.S. Cl.
CPC ................... *B60R 1/26* (2022.01); *B60R 1/12* (2013.01); *B60R 11/04* (2013.01); *G06V 20/58* (2022.01);
(Continued)

(58) Field of Classification Search
CPC .... B60R 1/26; B60R 1/25; B60R 1/27; B60R 11/04; B60R 2011/004; B60R 2300/301; B60R 2300/8026; B60R 2300/8066; B60R 2300/8093; B60R 2300/804; B60R 2300/8033; B60R 2300/806; B60R 2300/205; B60R 2300/202; B60R 2300/207; B60R 2300/306; B60R 2300/8013; B60R 2300/802; B60R 1/007;
(Continued)

(56) References Cited

U.S. PATENT DOCUMENTS

| 2015/0203033 | A1 | 7/2015 | Watanabe et al. |
| 2016/0119586 | A1* | 4/2016 | Riad ...................... H04N 7/183 348/148 |

(Continued)

FOREIGN PATENT DOCUMENTS

| JP | 2010066533 A | 3/2010 |
| JP | 2014038520 A | 2/2014 |

OTHER PUBLICATIONS

Sep. 15, 2021 European Search Report issued in corresponding International U.S. Appl. No. 21/180,263.

*Primary Examiner* — Nathnael Aynalem
(74) *Attorney, Agent, or Firm* — Clements Bernard Walker; Christopher L. Bernard

(57) ABSTRACT

A monitoring system for a vehicle. The monitoring system includes at least one imaging sensor arranged at a side mirror of a front-seat passenger side of the vehicle, a displaying unit arranged in a visual range of a driver of the vehicle, and a control unit configured to receive information on a status of at least a turning indicator. The imaging sensor is configured to capture image data of an environment of the vehicle. The displaying unit is configured to display the image data of the imaging sensor. The control unit is configured to control the display of the image data by means of the displaying unit based on the information of the status of the turning indicator.

10 Claims, 4 Drawing Sheets

(51) Int. Cl.
 *B60R 1/12* (2006.01)
 *B60R 11/04* (2006.01)
 *B60R 11/00* (2006.01)

(52) U.S. Cl.
 CPC . *B60R 2001/1253* (2013.01); *B60R 2011/004* (2013.01); *B60R 2300/301* (2013.01); *B60R 2300/70* (2013.01); *B60R 2300/8026* (2013.01)

(58) Field of Classification Search
 CPC .... G06V 20/58; G06V 20/588; G06V 20/593; G06V 20/597; G08G 1/167
 USPC ........................................................ 348/148
 See application file for complete search history.

(56) References Cited

U.S. PATENT DOCUMENTS

2018/0154831 A1* 6/2018 Spencer ................. H04N 23/90
2018/0170261 A1* 6/2018 Kaltenmark ........... H04N 23/60

\* cited by examiner

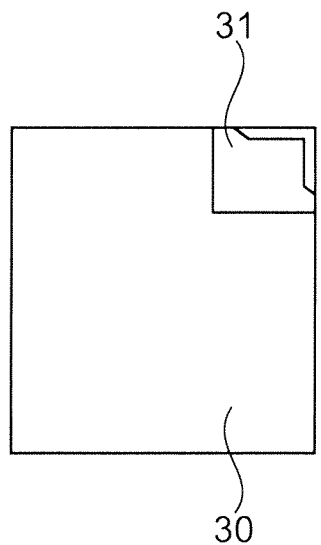 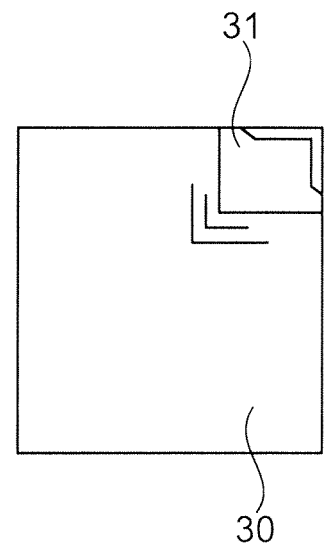 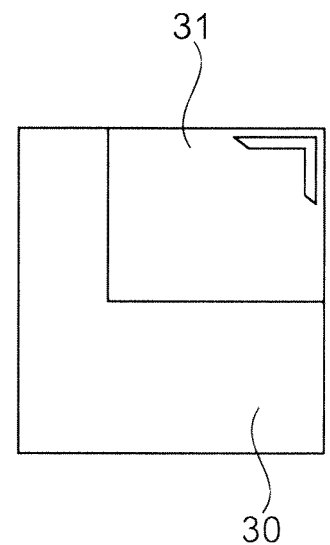
Fig. 3a  Fig. 3b  Fig. 3c
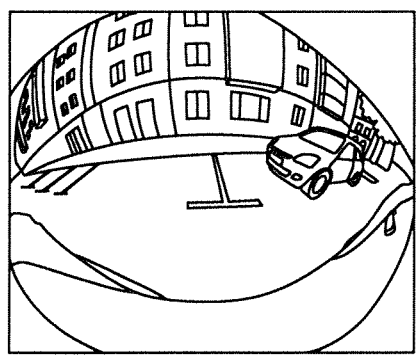 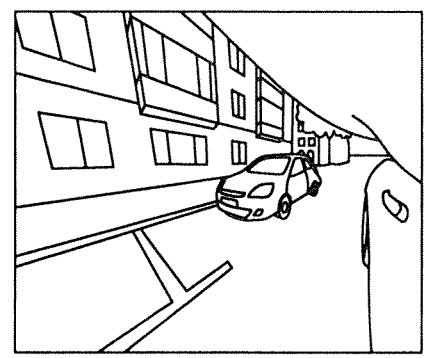
Fig. 4a  Fig. 4b

MONITORING SYSTEM FOR A VEHICLE

CROSS-REFERENCE TO RELATED APPLICATION

The present disclosure claims the benefit of priority of co-pending European Patent Application No. 21 180 263.2, filed on Jun. 18, 2021, and entitled "Monitoring System for a Vehicle," the contents of which are incorporated in full by reference herein.

TECHNICAL FIELD

The present disclosure relates to a monitoring system for a vehicle, a vehicle including such a monitoring system, a method for monitoring such a vehicle and a computer program element for monitoring such a vehicle.

BACKGROUND

When driving a vehicle, a driver's sight is sometimes hindered or even blocked by an obstacle inside and/or outside the vehicle, which may cause an accident. There are several monitoring systems which monitor a situation around an environment of the vehicle. The conventional monitoring systems, however, do not consider the situation inside the vehicle, particularly if an obstacle inside the vehicle interfere the driver's sight or not. Such an obstacle may be even more dangerous, if the driver wants to turn a driving direction or change a driving lane.

SUMMARY

Hence, there may be a need to provide an improved monitoring system, which assists a driver, particularly when the driver's view is hindered.

The problem is solved by the subject matter of the present disclosure. It should be noted that the aspects of the disclosure described in the following apply to the monitoring system for a vehicle, the vehicle including such a monitoring system, the method for monitoring such a vehicle and the computer program element for monitoring such a vehicle.

According to the present disclosure, a monitoring system for a vehicle is presented. The monitoring system includes at least one imaging sensor arranged at a side mirror of a front-seat passenger side of the vehicle, a displaying unit arranged in a visual range of a driver of the vehicle, and a control unit configured to receive information on a status of at least a turning indicator. The imaging sensor is configured to capture image data of an environment of the vehicle. The displaying unit is configured to display the image data of the imaging sensor. The control unit is configured to control the display of the image data by means of the displaying unit based on the information of the status of the turning indicator.

Accordingly, the monitoring system according to the disclosure may increase safety of the vehicle and ensure that driver still has a full and/or reliable outside view of the vehicle, even though a physical view of at least one side mirror is obscured.

The imaging sensor may be configured to mimic a physical side view through driver's eyes. The imaging sensor may be a part of a camera, which may continuously capture the environment of the vehicle and produce corresponding image data. Preferably, the camera of the imaging sensor may include a fisheye lens, which may provide a wide-angle image. The imaging sensor may be mounted at one side mirror, which is arranged away from the driver. In other words, the imaging sensor may be arranged on a right side mirror of the vehicle in a left hand driving vehicle or on a left side mirror of the vehicle in a right hand driving vehicle. However, each of both side mirrors of the vehicle may also include a camera having a fisheye lens such that the image data of both sides of the vehicle may be forwarded to the control unit.

The status of the turning indicator may be understood as an activation and/or deactivation of the turning indicator. The turning indicator may indicate a right turn, left turn or lane change to the right or left of the vehicle. As soon as the turning indicator is activated manually by the driver or automatically by the drive assistance system, the control unit may send real-time image data to the displaying unit. Those image data may be generated by the imaging sensor arranged at the side mirror of the front-seat passenger side of the vehicle. For instance, if the turning indicator is switched on in a left turn direction and the imaging sensor is arranged at the left side mirror, the control unit may enable the displaying unit to display the real- time image captured by the left side mirror, which may be the front-seat passenger side of the vehicle. Whereas if the turning indicator of the vehicle is switched on in a right turn direction and the imaging sensor is arranged at the right side mirror, the control unit may enable the displaying unit to display the real-time image captured by the right side mirror, which may be the front-seat passenger side of the vehicle.

In an example, the real-time image data captured by the imaging sensor may be rectified by the control unit before the image data are sent to the displaying unit. The control unit may receive the image data from the imaging sensor(s) and convert the fisheye images into bird's eye view images. In other words, the image captured by the fisheye lens camera may be processed as a bird's eye view image, which may be sent to the displaying unit. Accordingly, the displaying unit may display a rectified image, which may mimic the side view through the driver's eye.

To facilitate a utilization of the displaying unit, the displaying unit may be arranged in a driver's visual field. Accordingly, the displaying unit may be arranged in a front side of the driver. Hence, the displaying unit may be integrated in a Center Stack Display (SCD), Head Up Display (HUD), Drivers Information Module (DIM) and/or Infotainment Head Unit (IHU). The displaying unit may be configured to overlay the real-time image of the respective direction based on the information of the status of the turning indicator.

In an embodiment, the control unit is configured to switch the display of the image data on in case the turning indicator of the front-seat passenger side of the vehicle is activated. While the vehicle travels straight ahead and/or the turning indicator is deactivated, the displaying unit may show a map or any other image set by the driver. However, if the turning indicator, particularly of the front-seat passenger side of the vehicle, is activated, the control unit may change the image of the displaying unit such that the displaying unit shows the environment, in particular street view, of the front-seat passenger side of the vehicle.

In other words, if a right turning indicator is activated in the left hand driving vehicle, the control unit may enable the displaying unit to change the display to the real-time environment image of the right side of the vehicle. Whereas if a left turning indicator is activated in the right hand driving vehicle, the control unit may enable the displaying unit to change the display to the real-time environment image of the left side of the vehicle.

Accordingly, even though the driver's sight to the side mirror of the front-seat passenger side is interfered by an obstacle, the driver may receive real-time information about a road and/or environment situation around the vehicle.

In an embodiment, the control unit is configured to switch the display of the image data in an enlarged view in case the turning indicator of the front-seat passenger side of the vehicle is activated. In an embodiment, the control unit is configured to switch the display of the image data in a reduced view in case the turning indicator of the front-seat passenger side of the vehicle is deactivated.

While the vehicle travels straight ahead and/or the turning indicator is deactivated, the display unit may minimize or even hide the image captured by the imaging sensor arranged at the front-seat passenger side of the vehicle and display only the image set by the driver. The minimized image may be arranged in one corner of the displaying unit or the hidden image may be indicated by an icon. However, as soon as the turning indicator of the front-seat passenger side is activated, the control unit may enable the displaying unit to enlarge the image captured by the imaging sensor arranged at the front-seat passenger side, which may be same as a view reflecting by the side mirror of the front-seat passenger side of the vehicle. Accordingly, a safe lane change or turning of the vehicle may be ensured even though the driver's sight to the side mirror of the front-seat passenger side of the vehicle may be interfered.

In an embodiment, the control unit is further configured to receive information on an obstruction of a sight line between the driver and the side mirror of the front-seat passenger side of the vehicle. The control unit is also configured to control the display of the image data by means of the displaying unit based on the information on the obstruction of the sight line between the driver and the side mirror.

The control unit may receive any signal for the obstruction, which may interfere the driver's sight between the driver and the side mirror of the front-seat passenger side of the vehicle. The control unit may receive the information on the obstruction by a weight sensor on a front passenger seat, status of the safety belt and/or status of an airbag. In such a case, the control unit may enable the displaying unit to display the street view of the front-seat passenger side, especially when the turning indicator in the direction of the front-seat passenger side is activated. Accordingly, a safe lane change or turning of the vehicle may be ensured.

In an embodiment, the control unit is configured to switch the display of the image data in an enlarged view only in case the turning indicator of the front-seat passenger side of the vehicle is activated and the sight line between the driver and the side mirror is at least partially obstructed. In other words, the control unit may enable the displaying unit to display the enlarged view of the environment of the front-seat passenger side only if the turning indicator is switched on in the direction of the front-seat passenger side and simultaneously the control unit receives information on the obstruction of the sight line between the driver and the side mirror of the front-seat passenger side of the vehicle. Accordingly, the control unit may optimize displaying the enlarged view on the displaying unit based on driver's needs.

In an embodiment, the control unit is configured to receive information on the obstruction of the sight line between the driver and the side mirror based on a status of a child car seat socket, in case the child car seat socket is used, the sight line is assumed to be obstructed by a child car seat.

The control unit may receive information whether the child car seat is mounted on the front passenger seat or not, which may at least partially obstruct the driver's sight in the direction of the side mirror arranged in the front-seat passenger side. The child car seat may be fixed on the child car seat socket via an Isofix interface, a top tether interface or the like. As soon as the child car seat socket is connected to the child car seat, the control unit may consider it as an obstruction, which may hinder the driver's view to the side mirror of the front-seat passenger side. Accordingly, if the child car seat is mounted on the front passenger seat, the control unit may control the display of the image data on the displaying unit based on the information of the status of the turning indicator.

In an embodiment, the control unit is configured to receive information on the obstruction of the sight line between the driver and the side mirror based on a status of a passenger airbag, in case the passenger airbag is deactivated, the sight line is assumed to be obstructed by a child car seat.

The passenger airbag, preferably of the front-seat passenger side, may be deactivated, if the seat is loaded with bulky goods. For instance, if the child car seat is mounted on the front passenger seat, the passenger airbag is generally deactivated for safety reasons. Hence, the control unit may consider the deactivation of the airbag as an obstruction placed on the front passenger seat, which may hinder the driver's view to the side mirror of the front-seat passenger side. Accordingly, if the airbag of the front-seat passenger side is deactivated, the control unit may control the display of the image data on the displaying unit based on the information of the status of the turning indicator.

In an embodiment, the control unit may be configured to receive information on the obstruction of the sight line between the driver and the side mirror based on a status of a child car seat socket and a status of a passenger airbag, in case the passenger airbag is deactivated, the sight line is assumed to be obstructed by a child car seat. Accordingly, a safe lane change or turning of the vehicle may be ensured.

In an embodiment, the monitoring system further includes at least one imaging sensor arranged at a side mirror of a driver side of the vehicle. The control unit is configured to switch the display of the image data on in case the turning indicator of the driver side of the vehicle is activated. In other words, the imaging sensors may be arranged at each side mirror. Preferably, the imaging sensors arranged at both side mirrors may include a fish-eye lens. Accordingly, if the left turning indicator is activated, the control unit may control the displaying unit to display the environment of the left side of the vehicle. Whereas if the right turning indicator is activated, the control the control unit may control the displaying unit to display the environment of the right side of the vehicle.

In an embodiment, the monitoring system further includes a radar unit configured to monitor a blind spot. The control unit is configured to indicate information of the blind spot on the display unit in case the turning indicator of the front-seat passenger side or the turning indicator of the driver side is activated. The control unit may control the displaying unit to display a signal if an obstacle such as an approaching vehicle or pedestrian is detected in the blind spot of the front-seat passenger side by the radar unit. The signal may be separately displayed from the environment image, which may be enlarged or reduced with respect to the activation/deactivation of the turning indicator. Alternatively, the signal may be combined with the environment image, particularly when the image is enlarged.

According to the present disclosure, a vehicle is presented. The vehicle includes a monitoring system as described above. Such a monitoring system may be a part of a driver assistance system of the vehicle, which may support the driver to drive the vehicle more safely and comfortably.

According to the present disclosure, a method for monitoring a vehicle is presented. The method includes, not necessarily in this order:
- receiving information on a status of at least a turning indicator,
- capturing image data of an environment of the vehicle by at least one imaging sensor arranged at a side mirror of a front-seat passenger side of the vehicle,
- displaying the image data of the imaging sensor on a displaying unit, and
- controlling the display of the image data by means of the displaying unit based on the information of the status of the turning indicator,
- wherein the displaying unit is arranged in a visual range of a driver of the vehicle.

Accordingly, the monitoring system according to the disclosure may increase a safety of the vehicle and ensure that driver still has a full view of an outside the vehicle, even though a physical view of at least one side mirror is obscured.

In an embodiment, the method further includes switching the display of the image data in an enlarged view in case the turning indicator of the front-seat passenger side of the vehicle is activated, and switching the display of the image data in a reduced view in case the turning indicator of the front-seat passenger side of the vehicle is deactivated. In an embodiment, the method may further include switching the display of the image data in an enlarged view in case the turning indicator of a driver side of the vehicle is activated, and switching the display of the image data in a reduced view in case the turning indicator of the driver side of the vehicle is deactivated.

While the vehicle travels straight ahead and/or the turning indicator is deactivated, the display unit may minimize or even hide the image captured by the side mirror of the front-seat passenger side and display the image set by the driver. However, as soon as the turning indicator of the front-seat passenger side is activated, the control unit may enable the displaying unit to enlarge the image captured by the imaging sensor arranged at the front-seat passenger side, which may be same as a view reflecting by the side mirror of the front-seat passenger side of the vehicle. After the turning indicator is deactivated, the enlarged view may be reduced again. Accordingly, a safe lane change or turning of the vehicle may be ensured even though the driver's sight to the side mirror of the front-seat passenger side of the vehicle may be interfered.

According to the present disclosure, a computer program element for monitoring a vehicle is presented. The computer program element is adapted to perform the monitoring method as described above, which when being executed by a processing element.

It should be noted that the above embodiments may be combined with each other irrespective of the aspect involved. Accordingly, the method may be combined with structural features and, likewise, the system may be combined with features described above with regard to the method.

These and other aspects of the present embodiments will become apparent from and elucidated with reference to the embodiments described hereinafter.

BRIEF DESCRIPTION OF THE DRAWINGS

Exemplary embodiments will be described in the following with reference to the following drawings.

FIG. 3a, 3b, 3c show schematically and exemplarily an embodiment of a displaying unit according to the present disclosure.

FIG. 4a, 4b show schematically and exemplarily a street view on a displaying unit according to the present disclosure.

DESCRIPTION OF EMBODIMENTS

Figure 1:
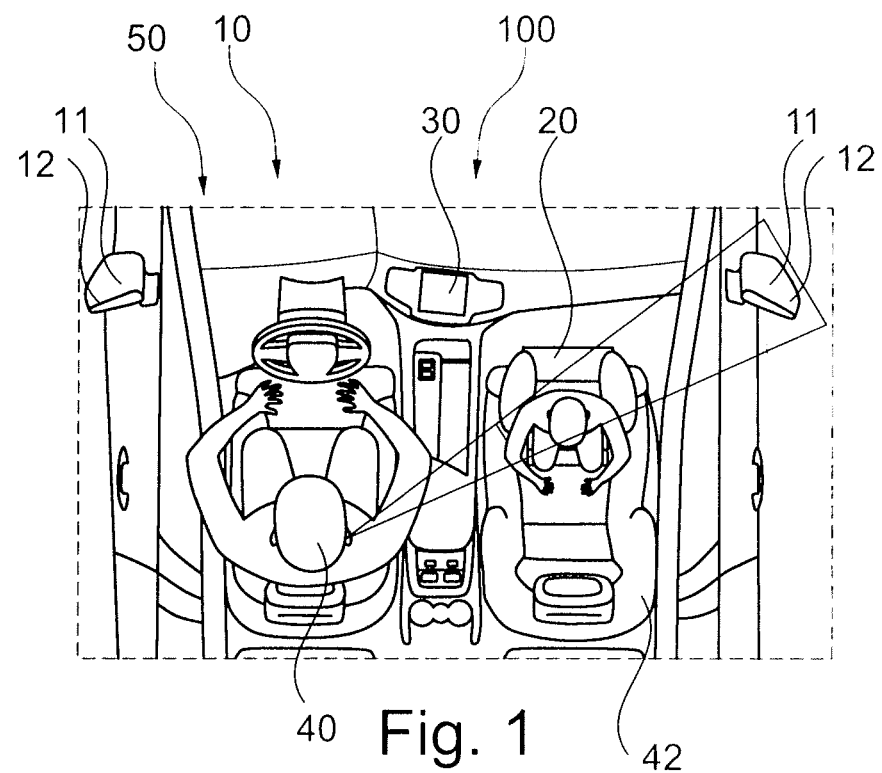
FIG. 1 shows schematically and exemplarily an embodiment of a vehicle according to the present disclosure.

FIG. 1 shows a vehicle 100 including a monitoring system 10 according to the present disclosure. The monitoring system 10 includes at least one imaging sensor 12 arranged at a side mirror 11 of a front-seat passenger side 42 of the vehicle 100, a displaying unit 30 arranged in a visual range 41 of a driver 40 of the vehicle 100, and a control unit 50 configured to receive information on a status of at least a turning indicator. The monitoring system 10 may preferably include at least two imaging sensors 12 each of which is arranged at each side mirror 11.

The imaging sensor 12 is configured to produce image data of an environment of the vehicle 100. The imaging sensor 12 may preferably include a fisheye lens to provide a wide environment/street view. The control unit 50 is configured to receive real-time image data captured by the imaging sensor 12 and to control displaying the image data on the displaying unit 30. The control unit 50 may be, for instance an electronic control unit (ECU) of the vehicle 100.

Figure 2:
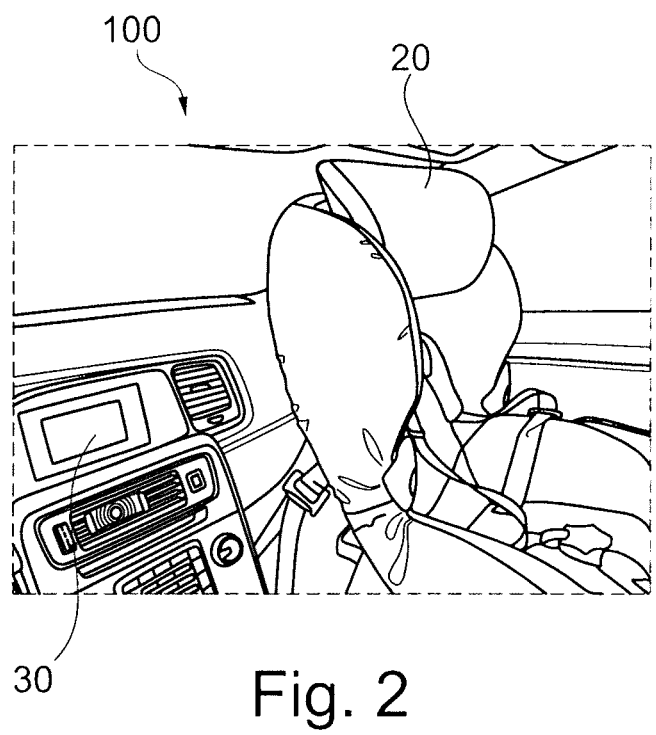
FIG. 2 shows schematically and exemplarily an embodiment of a vehicle according to the present disclosure.

The displaying unit 30 is configured to display the image data generated by the imaging sensor. The displaying unit 30 shown in FIG. 1 and FIG. 2 is integrated in Center Stack Display (SCD) and/or Infotainment Head Unit (IHU). However, the displaying unit 30 may be also integrated in Head Up Display (HUD) and/or Drivers Information Module (DIM).

The control unit 50 is further configured to receive information on a status of at least one turning indicator, preferably both turning indicators, whether one of the turning indicators is activated or not. The control unit 50, thus, controls the displaying unit 30 based on the information of the status of the turning indicator.

As shown in FIG. 1 and FIG. 2, an obstruction 20, in this case a child car seat, is mounted on a front passenger seat and interferes a sight line 41 of the driver 40 in direction of the side mirror 11 of the front-seat passenger side 42 of the vehicle 100. If the control unit 50 receives information that a child car seat socket such as an Isofix and/or a top tether interface is connected to the child car seat, the control unit 50 identifies the child car seat as an obstruction 20 of the sight line 41 between the driver and the side mirror 11 of the front-seat passenger side 42. Additionally or alternatively, if a passenger airbag at the front-seat passenger side 42 is deactivated, the control unit 50 assumes that the sight line 41 between the driver and the side mirror 11 of the front-seat passenger side 42 is also obstructed.

If the turning indicator of the front-seat passenger side 42 is activated by the driver 40 or by a driver assistance system, the control unit 50 switches the display of the image data received from the imaging sensor 12 on the displaying unit 30 on. In this case, the image data are the environment and/or street view data of the front-seat passenger side 42. Preferably, the environment and/or street view 31 displayed on the displaying unit 30 is reduced or depicted as an icon arranged at a right top corner of the displaying unit 30 if the turning indicator is deactivated (see FIG. 3a). As soon as the turning indicator of the front-seat passenger side 42 is activated, however, the control unit 50 enable displaying an enlarged view 31 of the environment or street of the front-seat passenger side 42 as an overlay, which expands from the right top corner to the substantially entire display area (see FIG. 3b and FIG. 3c). It should be noted that the view may be positioned at any suitable position on said displaying unit 30.

The monitoring system 10 further includes a radar unit 16 (see also FIG. 6) configured to monitor a blind spot. Hence, the control unit 50 is further configured to display a signal on the enlarged environment view 31 on the displaying unit 30 if an obstacle such as an approaching vehicle or pedestrian is detected by the radar unit in the blind spot of the front-seat passenger side 42.

Figure 5:
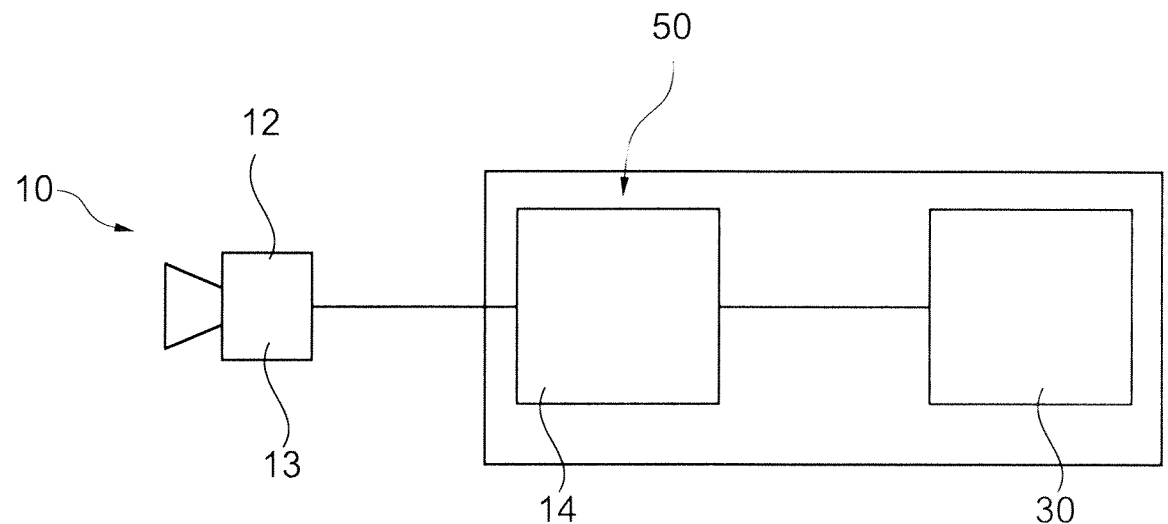
FIG. 5 shows schematically and exemplarily a monitoring system according to the present disclosure.

FIG. 5 shows a simplified monitoring system 10 according to the present disclosure. The monitoring system 10 includes a camera 13 having the imaging sensor 12, which generates real-time image data of the environment of the vehicle 100. The image data may be sent to a compute node 14 of the control unit 50 via a Gigabit Multimedia Serial Link (GMSL) to process the real-time image data suitable for the displaying unit 30. Preferably, the imaging sensor 12 includes a fisheye lens providing a wide angle image. The compute node 14 may process the image data generated by the fisheye lens to a bird's eye image data to mimic a side view through the driver's eye via the side mirror 11 (see FIG. 4a and FIG. 4b).

Figure 6:
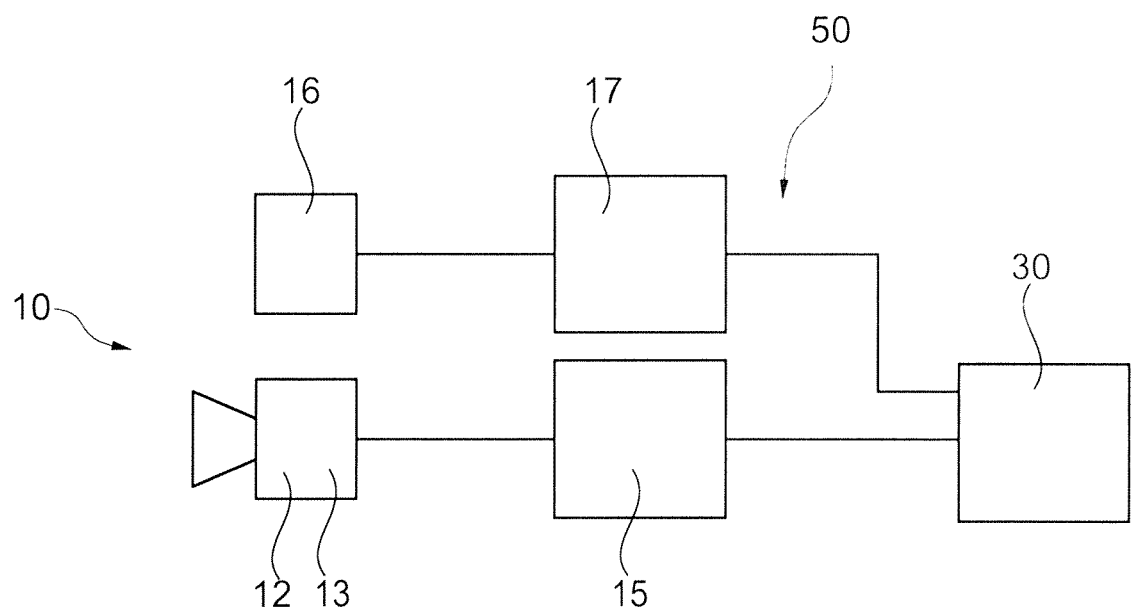
FIG. 6 shows schematically and exemplarily a monitoring system according to the present disclosure.

FIG. 6 shows the monitoring system 10 including the radar unit 16 for monitoring additionally the blind spot of the driver. The radar unit 16 may send real-time radar data to a threat assessment element 17 of the control unit 50 to verify an approaching vehicle and/or pedestrian in the direction to which the turning indicator is activated. If the radar unit 16 identifies any obstacles in the blind spot, the control unit 50 may allow the displaying unit 30 to indicate the obstacles as a signal.

Figure 7:
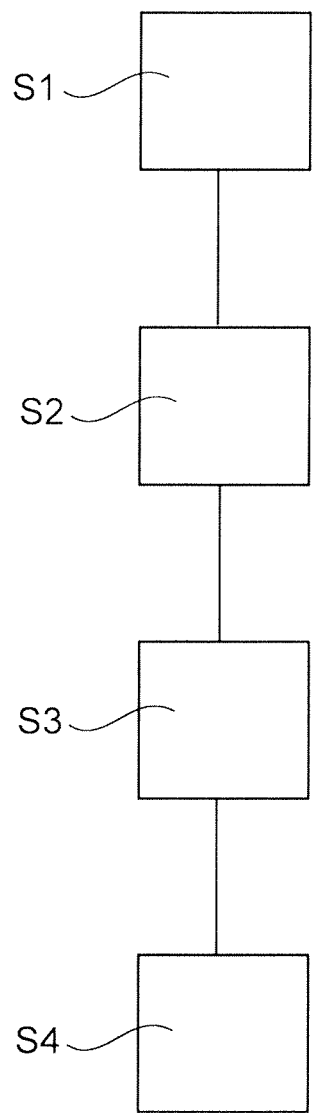
FIG. 7 shows schematically and exemplarily a method for monitoring a vehicle according to the present disclosure.

FIG. 7 shows a method for monitoring a vehicle. The method includes:
  receiving S1 information on a status of at least a turning indicator,
  capturing S2 image data of an environment of the vehicle 100 by at least one imaging sensor 12 arranged at a side mirror 11 of a front-seat passenger side 42 of the vehicle 100,
  displaying S3 the image data of the imaging sensor 12 on a displaying unit 30, and
  controlling S4 the display of the image data by means of the displaying unit 30 based on the information of the status of the turning indicator,
  wherein the displaying unit 30 is arranged in a visual range of a driver of the vehicle 100.

It has to be noted that embodiments of the disclosure are described with reference to different subject matter. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matter is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A monitoring system for a vehicle, the monitoring system comprising:
  at least one imaging sensor being arranged at a side mirror of a front-seat passenger side of the vehicle,
  a displaying unit being arranged in a visual range of a driver of the vehicle, and
  a control unit being configured to receive information on a status of at least a turning indicator,
  the imaging sensor being configured to capture image data of an environment of the vehicle,
  the displaying unit being configured to display the image data of the imaging sensor,
  the control unit being configured to control the display of the image data by means of the displaying unit based on the information of the status of the turning indicator,
  the control unit being configured to receive information on an obstruction of a sight line between the driver and the side mirror of the front-seat passenger side of the vehicle,
  the control unit being configured to control the display of the image data by means of the displaying unit based on the information on the obstruction of the sight line between the driver and the side mirror, and
  the control unit being configured to
    switch the display of the image data in an enlarged view only in case the turning indicator of the front-seat passenger side of the vehicle is activated and the sight line between the driver and the side mirror is at least partially obstructed, or
    receive information on the obstruction of the sight line between the driver and the side mirror based on a status of a passenger airbag, in case the passenger airbag is deactivated, the sight line is assumed to be obstructed by a child car seat.

2. The monitoring system according to claim 1, the control unit being configured to switch the display of the image data on in case the turning indicator of the front-seat passenger side of the vehicle is activated.

3. The monitoring system according to claim 1, the control unit being configured to switch the display of the image data in an enlarged view in case the turning indicator of the front-seat passenger side of the vehicle is activated.

4. The monitoring system according to claim 1, the control unit being configured to switch the display of the image data in a reduced view in case the turning indicator of the front-seat passenger side of the vehicle is deactivated.

5. The monitoring system according to claim 1, the control unit being configured to receive information on the obstruction of the sight line between the driver and the side mirror based on a status of a child car seat socket, in case the child car seat socket is used, the sight line is assumed to be obstructed by a child car seat.

6. The monitoring system according to claim 1, further comprising at least one imaging sensor being arranged at a side mirror of a driver side of the vehicle, the control unit being configured to switch the display of the image data on in case the turning indicator of a driver side of the vehicle is activated.

7. The monitoring system according to claim 1, further comprising a radar unit configured to monitor a blind spot, the control unit being configured to indicate information of the blind spot on the display unit in case the turning indicator of the front-seat passenger side or the turning indicator of the driver side is activated.

8. A vehicle comprising the monitoring system according to claim 1.

9. A method for monitoring a vehicle, the method comprising:
    receiving information on a status of at least a turning indicator,
    capturing image data of an environment of the vehicle by at least one imaging sensor arranged at a side mirror of a front-seat passenger side of the vehicle,
    displaying the image data of the imaging sensor on a displaying unit,
    controlling the display of the image data by means of the displaying unit based on the information of the status of the turning indicator, and
    switching the display of the image data in an enlarged view only in case the turning indicator of the front-seat passenger side of the vehicle is activated and a sight line between the driver and the side mirror is at least partially obstructed, and switching the display of the image data in a reduced view in case the turning indicator of the front-seat passenger side of the vehicle is deactivated,
    the displaying unit being arranged in a visual range of a driver of the vehicle.

10. A non-transitory computer-readable medium comprising instructions stored in a memory and executed by a processor to carry out method steps for monitoring a vehicle, the method steps comprising:
    receiving information on a status of at least a turning indicator,
    capturing image data of an environment of the vehicle by at least one imaging sensor arranged at a side mirror of a front-seat passenger side of the vehicle,
    displaying the image data of the imaging sensor on a displaying unit, and
    controlling the display of the image data by means of the displaying unit based on the information of the status of the turning indicator, and
    switching the display of the image data in an enlarged view only in case the turning indicator of the front-seat passenger side of the vehicle is activated and a sight line between the driver and the side mirror is at least partially obstructed, and switching the display of the image data in a reduced view in case the turning indicator of the front-seat passenger side of the vehicle is deactivated,
    the displaying unit being arranged in a visual range of a driver of the vehicle.

* * * * *